US009060102B2

(12) United States Patent　　(10) Patent No.: US 9,060,102 B2
Cook　　(45) Date of Patent: Jun. 16, 2015

(54) INTEGRATED SYSTEM FOR UNDERWATER VIEWING AND COMMUNICATIONS IN TURBID WATER

(76) Inventor: David Dwight Cook, Phoenix, AZ (US)

( * ) Notice: Subject to any disclaimer, the term of this patent is extended or adjusted under 35 U.S.C. 154(b) by 391 days.

(21) Appl. No.: 13/464,313

(22) Filed: May 4, 2012

(65) Prior Publication Data

US 2012/0281054 A1　　Nov. 8, 2012

Related U.S. Application Data

(60) Provisional application No. 61/483,151, filed on May 6, 2011.

(51) Int. Cl.
　　*H04N 9/47*　　(2006.01)
　　*H04N 7/18*　　(2006.01)
　　*G09B 19/00*　　(2006.01)
　　*G09B 25/02*　　(2006.01)
　　*B63C 11/49*　　(2006.01)

(52) U.S. Cl.
　　CPC ............... *H04N 7/185* (2013.01); *B63C 11/49* (2013.01)

(58) Field of Classification Search
　　USPC ..................................................... 348/41–161
　　See application file for complete search history.

(56) References Cited

U.S. PATENT DOCUMENTS

| | | | | |
|---|---|---|---|---|
| 4,212,258 A * | 7/1980 | Collins | ........................ | 114/312 |
| 4,485,398 A * | 11/1984 | Chapin et al. | ................... | 348/81 |
| 5,079,753 A * | 1/1992 | Suggs | ........................... | 367/107 |
| 5,148,412 A * | 9/1992 | Suggs | ........................... | 367/131 |
| 5,628,271 A * | 5/1997 | McGuire | ........................ | 114/222 |
| 5,947,051 A * | 9/1999 | Geiger | ............................ | 114/313 |
| 6,017,400 A * | 1/2000 | Clark et al. | ..................... | 134/21 |
| 6,293,733 B1 * | 9/2001 | Tezuka | ........................... | 405/185 |
| 6,425,340 B1 * | 7/2002 | McGuire | ........................ | 114/222 |
| 6,595,152 B2 * | 7/2003 | McGuire | ........................ | 114/222 |
| 6,612,251 B1 * | 9/2003 | Ness | ................................ | 114/66 |
| 6,762,678 B2 * | 7/2004 | Arens | .......................... | 340/506 |
| 6,817,359 B2 * | 11/2004 | Deas et al. | ............... | 128/201.27 |
| 6,900,954 B2 | 5/2005 | Tichy | | |
| 7,326,916 B2 * | 2/2008 | Sugiyama et al. | ........ | 250/227.14 |
| 7,333,395 B2 * | 2/2008 | Lewis et al. | .................... | 367/139 |
| 7,835,226 B2 * | 11/2010 | Kokosalakis et al. | ........... | 367/83 |
| 7,926,438 B2 * | 4/2011 | Guerrero et al. | .............. | 114/312 |
| 8,120,650 B2 * | 2/2012 | Laser | ............................... | 348/81 |
| 8,638,362 B1 * | 1/2014 | Thompson et al. | ............. | 348/81 |
| 8,654,189 B1 * | 2/2014 | Spangler et al. | ................ | 348/81 |
| 8,804,461 B2 * | 8/2014 | Imran | .......................... | 367/134 |
| 2004/0086838 A1 * | 5/2004 | Dinis | ............................ | 434/247 |
| 2006/0196499 A1 * | 9/2006 | Cannizzaro | .............. | 128/200.14 |

(Continued)

*Primary Examiner* — Joseph Ustaris
*Assistant Examiner* — Talha Nawaz

(57) ABSTRACT

An integrated system for diving operations for use in turbid water by a remote operator comprising a surface console station that supports the receipt of tethered command and control of system components and display for received real-time video via a communications channel; a remote wearable information processing unit tethered to the surface console station and having integrated controls; a wearable human interface system connected to the remote wearable information processing unit and including a video display and two-way audio system; a viewing enhancing device tethered to the remote wearable information processing unit and the surface console station, including an image capture device; and a fluid clarification unit coupled to the viewing enhanced apparatus. The apparatus may be worn and operated by a diver, mounted on a remotely operated vehicle or manipulated remotely while mounted on the end of a pole and may include an array of viewing enhancing devices.

22 Claims, 11 Drawing Sheets

(56) References Cited

U.S. PATENT DOCUMENTS

| | | | |
|---|---|---|---|
| 2006/0216007 A1* | 9/2006 | Moreb | 396/25 |
| 2007/0242134 A1* | 10/2007 | Zernov | 348/81 |
| 2010/0270389 A1* | 10/2010 | Feldman | 239/2.1 |
| 2011/0055746 A1* | 3/2011 | Mantovani et al. | 715/771 |
| 2011/0228074 A1* | 9/2011 | Parulski et al. | 348/81 |
| 2011/0228075 A1* | 9/2011 | Madden et al. | 348/81 |
| 2012/0065486 A1* | 3/2012 | Imran | 600/323 |
| 2012/0133758 A1* | 5/2012 | Foss et al. | 348/81 |

* cited by examiner

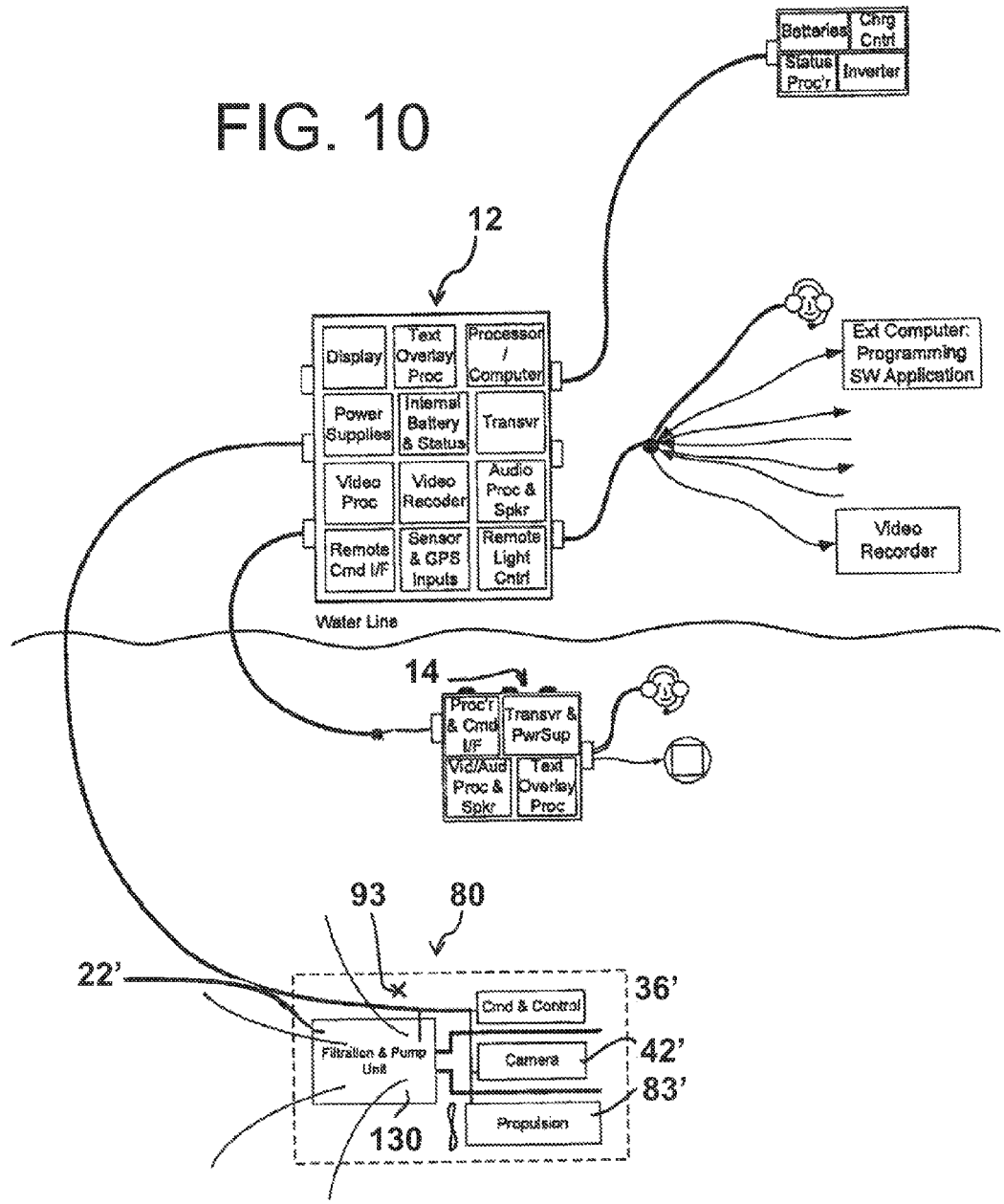

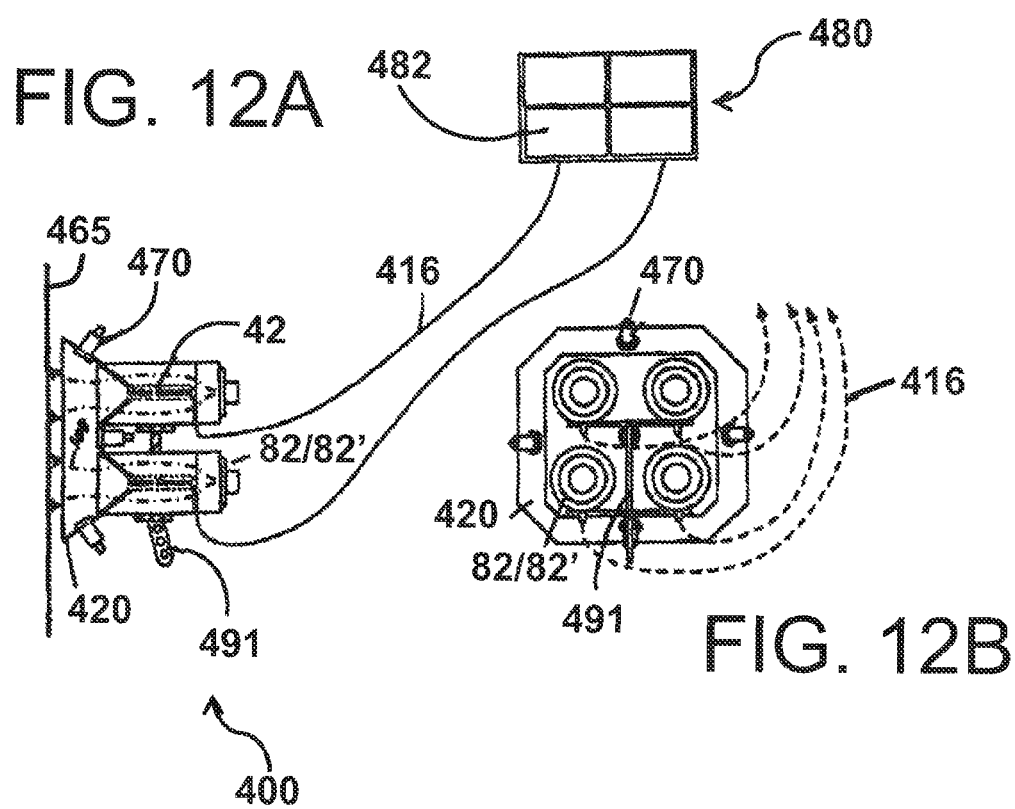

INTEGRATED SYSTEM FOR UNDERWATER VIEWING AND COMMUNICATIONS IN TURBID WATER

CROSS-REFERENCE TO RELATED APPLICATIONS

This application claims the benefit of U.S. Provisional Application 61/483,151, filed May 6, 2011.

TECHNICAL FIELD

The present invention relates to an integrated video, voice, and communications system for use in underwater inspections or other work performed in visibility impaired muddy, black, brown, or turbid water conditions (hereinafter generally referred to as "turbid water") whereby a remote diver and the surface console system has the capability of receiving the video image of the inspected area, in real time, that is captured by a camera-integrated visibility impaired viewing device. The remote diver may also communicate with a surface crew and control the system functions or operations from the remote underwater location. A surface console station (SCS) receives and processes the video stream signal received from either the diver's remote visibility impaired viewing device or as a digital video signal from diver's wearable computer. The SCS may also have the capability of providing overlaid text on either the remote video screen or the SCS video screen for viewing, documentation, or later analysis. A remotely operated vehicle (ROV) may also be used to carry the visibility impaired viewing device. The ROV may be controlled by the remote diver or an operator on land. Two or more visibility impaired viewing devices may be arranged in various arrays allowing for the remote viewing and analysis of larger surface areas, such as the wall of a dam, the cylindrical surface of a bridge piling, or the hull of a water vessel as it passes over the visibility impaired viewing devices. Specific user application software allows for the formatting, retrieval, reprogramming of all processing equipment and general facilitation of operations using this integrated system.

BACKGROUND OF THE INVENTION

In turbid water, a viewer typically sees nothing but a brown haze of silt, organic debris, or mud. Turbid water can be ubiquitous in such places as inland water ways, coastal shorelines, shipyards and construction sites, a sea floor experiencing storm action, archeological digs, the roiling bottom of the Mississippi River, industrial vats of water waste, or working conduits transferring opaque liquid, smoke, or other visibility-impairing gasses, foaming or sudsy liquids, etc. Turbid water can also be caused simply by a diver's movement, the churning up the silted sea bottom by an ROV in the normal course of doing work on the bottom or the disturbance of settled silt on underwater trees being harvested. For the diver in bio-hazardous or cold conditions, his or her only other input, the sense of touch while wearing gloves, is very limited at best. The quality of work may suffer, production may be slowed, and the diver's well-being may be endangered if the skin is exposed while attempting to closely examine a damaged bulkhead or corroded surface or perform an inspection. For a system utilizing an ROV which relies on a video camera for acquiring information, there is no alternative image acquisition in turbid water except SONAR and thermal imaging, neither of which have the color sense or the close-up resolution advantages of video.

A way of seeing through turbidity is to use a hydraulic system to displace the turbidity with an illuminated laminar flow or low turbulent jet stream of clear water through which, for example, a diver or video system can view the work or target area. Such a system is disclosed in U.S. Pat. No. 6,900,954, the relevant portions of which are herein incorporated by reference.

This disclosure describes an enhancing viewing apparatus for use in visibility-impairing fluid, such as turbid water or smoke, or the displacement of ambient gases with task-enhancing gases for welding purposes, for example. The apparatus provides a clear fluid stream to the viewing/work area. The stream's velocity profile minimizes turbulence at the boundary of the clear fluid stream and minimizes entrainment of the ambient turbid fluid into the clear fluid thereby providing a visibly clear media through which the area of interest may be viewed.

As disclosed in U.S. Pat. No. 6,900,954, The enhancing viewing apparatus may be mounted directly in a diver's line of view, such as on a helmet or mask, so that the diver (synonymous herein with "remote operator") looks through a window in the rear of the enhancing viewing apparatus and along the axis of the jet.

The apparatus may be altered to include or add a video camera to replace the human eye, may also be hand-held and manipulated by the diver; or alternatively, manipulated while at the end of a pole. However, if equipped with a video camera, one shortcoming of the prior art system is that there is no provision for the remote operator to see in real-time what the camera sees.

Another shortcoming of the prior art system is that the enhancing viewing apparatus is provided with clear viewing fluid only through a hose connected to a surface fluid supply. Such a hose, which may be very lengthy for relatively deep diving conditions or caught in underwater obstacles, can be a serious impediment to a diver's freedom of movement.

Another shortcoming of the prior art system is that the video system operating the camera is not capable of any electronically sophisticated transmission or data manipulation, video formatting, or distribution.

Another shortcoming is that there is no means to set up, format, configure, reprogram or provide updates to the information displayed on the video screens.

What is needed is an integrated system that addresses all of these shortcomings plus additional features to make a complete turnkey system. This integrated system allows a diver to be able to see, in real time, a displayed processed video image captured by the camera; provides a diver with text, messaging, and/or graphical data information in a mask or helmet mounted display; allows a visually impaired viewing device to operate with or without a hose connection to the surface supplying clear water; allows a diver operational control of the SCS, system operations or that of an ROV over a digital communications channel; provides video-over-IP and allows text/graphics overlay all while providing bi-directional, digital voice, message, command and control communications between the diver and the operator of the SCS.

It is a principal object of the present invention to provide improved diver capability, diver knowledge and situational awareness of real time events, communications, operational control of the system, video/audio-over-IP, clear water flow control to the VD, and data processing in all water conditions, especially turbid water conditions, while receiving the video/audio-over-IP stream from the RIPU, capturing the video for real-time, viewing, analysis, or historical records via the SCS or on the ROV.

Another object of the present invention is to provide a software user application that provides for the formatting of static and real-time operational data to be displayed on both the SCS and diver display, provides for the automatic software retrieval and reprogramming of both the SCS processing unit and the diver's remote information processing unit (RIPU), and provides for real-time text chatting with the remote diver or a plurality of divers.

Yet another object of the present invention is to provide a means of rapid inspection and viewing of large surface areas, such as bridge pillars, ship hulls or dam surfaces.

SUMMARY OF THE INVENTION

Briefly described, the present invention is directed to an integrated system of systems. The system comprises a Surface Console Station (SCS) having an information and video processor and a video display; a pumping/filtration system; a remote information and video processing unit (RIPU); a remote video display that may be mounted on a diver's mask or helmet; an enhanced visibility impaired viewing device (VD) containing a video camera; a user application software to configure text and graphics to be run and displayed on the SCS or remote displays and a voice communication system worn by the diver. Optionally, an ROV containing the VD may be remotely operated by the diver or by a tethered or wireless connection, alternatively, surface operator over a digital communications channel.

Between the SCS and the remote RIPU is a hardwire tether that allows and supports bi-directional digital video/voice-over-IP communications, a real-time, processed video feed from the VD camera, and system command and control instructions, system data status and messaging.

The real-time, unified, packetized, digital message scheme allows for low-latency, bi-directional voice and video-over-IP, redundant data and information exchange, and with data integrity validation between the SCS and RIPU, and command and control messages transmitted from the RIPU to the SCS to control diver-side or system functions.

The video image transmitted by the VD camera is received by the RIPU, processed and converted to video-over-IP and displayed on the remote video display and SCS video display. In each location, unique information text or graphical data is overlaid and displayed onto the real-time video image appropriate to that user (remote diver or local SCS operator).

With the RIPU and the integrated control mechanism, such as tactile buttons or voice commands, the operator can see a displayed menu by which he may select and then change or control either remote diver functions, such as audio volume or display brightness/contrast, or surface system operations, such as water flow rate, lighting intensity, music sound level, or maneuvering of an ROV, etc. The maneuvering and control of an ROV can be done over a tethered wired line or transmitted wirelessly.

The unique surface recirculating pump/filtration system creates and provides clear water or other clear liquid pumped to the VD which may be held and operated by the remote operator or integrated into other movable/steerable platforms such as an ROV. A VD, in accordance with the present invention, may be configured in one of two forms: 1) connected to a surface pumping/filtration system; or 2) attached to an integrated pumping filtration system, thereby eliminating the tethered umbilical hose to the surface. The integrated system may have external power provided or an onboard power supply, wherein clear water is created at the remote location, platform, or ROV.

A computer-based user software application, in accordance with the invention, performs several functions including: (1) allowing for the selection and formatting of textual and/or graphical information or data to be shown on the SCS display in a manner preferable to the user; (2) allowing for the selection and formatting of textual and/or graphical information or data to be displayed on the remote display in a manner preferable to the diver; (3) providing the means to retrieve and re-program the SCS or the RIPU operational firmware over the digital communications channel; (4) providing the means to retrieve revised versions of the user application, for use on the SCS; and (5) provide for instant commands, communications, text messaging or chatting between the SCS operator and the remote user or diver or a plurality of divers.

In another aspect of the invention, an apparatus consisting of an array of multiple VDs, a motorized track mechanism and a surface scrubber. In this device, the VDs may be arranged in a circumferential formation around a bridge piling combined with a surface scrubbing device preceding the VDs to clean the surface. With the motorized track mechanism, the multiple VDs are controlled to move up or down a bridge pillar to inspect the pillar structure. The clear water provided to the VDs would be directed to blow away or flush both the surface-scrubbed debris and the ambient turbid water immediately in front of the VDs providing a clear view of the surface for inspection. The video cameras of the VDs capture the live-feed or encoded (video/voice-over IP) video imagery during the movement and inspection may be viewed in real time and recorded for later analysis, historical records, or evidence of inspection.

In another aspect of the invention, in lieu of using a larger sized VD, a collection of VDs may be contained in a uniform array configuration to allow for a broader view of the area under inspection. Such a device may be used to inspect the face of a dam, for example. The multiple cameras may transmit the multiple individual video signals or a combined video-over-IP to the SCS to be displayed as either a separate monitor per camera or as a composite image.

Currently, the US Coast Guard requires regular inspection of water vessels registered in the United States. Only visual means of inspection is acceptable and inspections typically take place in turbid water of harbors and bays. In yet another aspect of the invention, rather than dry-docking the vessel for inspection, an array of VDs may be configured in a semi-fixed, semi-stationary, or portable fixture configuration. In this configuration, an entire hull of a ship may be inspected as it passes over the array of VDs.

In yet another aspect of the invention, the VDs may include a non-visual means for detecting the presence of structural anomalies in an underwater feature, such as in a boat hull or bridge pillar, using ultrasound for example. A further software application may be included to document and tag the presence of the detected anomalies and to transmit the documentation to the SCS.

BRIEF DESCRIPTION OF THE DRAWINGS

The present invention will now be described, by way of example, with reference to the accompanying drawings, in which:

FIG. 10 is a schematic of a remote operated vehicle containing a VD wherein the VD includes an integrated clear-water supply apparatus, in accordance with the present invention;

FIG. 12A is an elevational cross-sectional view of another application of an array of VDs used to view large surface areas, in accordance with the present invention;

FIG. 12B is an elevational rear view of the apparatus shown in FIG. 12A;

Corresponding reference characters indicate corresponding parts throughout the several views. The exemplifications set out herein illustrate currently preferred embodiments of the invention, and such exemplifications are not to be construed as limiting the scope of the invention in any manner.

DESCRIPTION OF THE PREFERRED EMBODIMENTS

Figure 1:
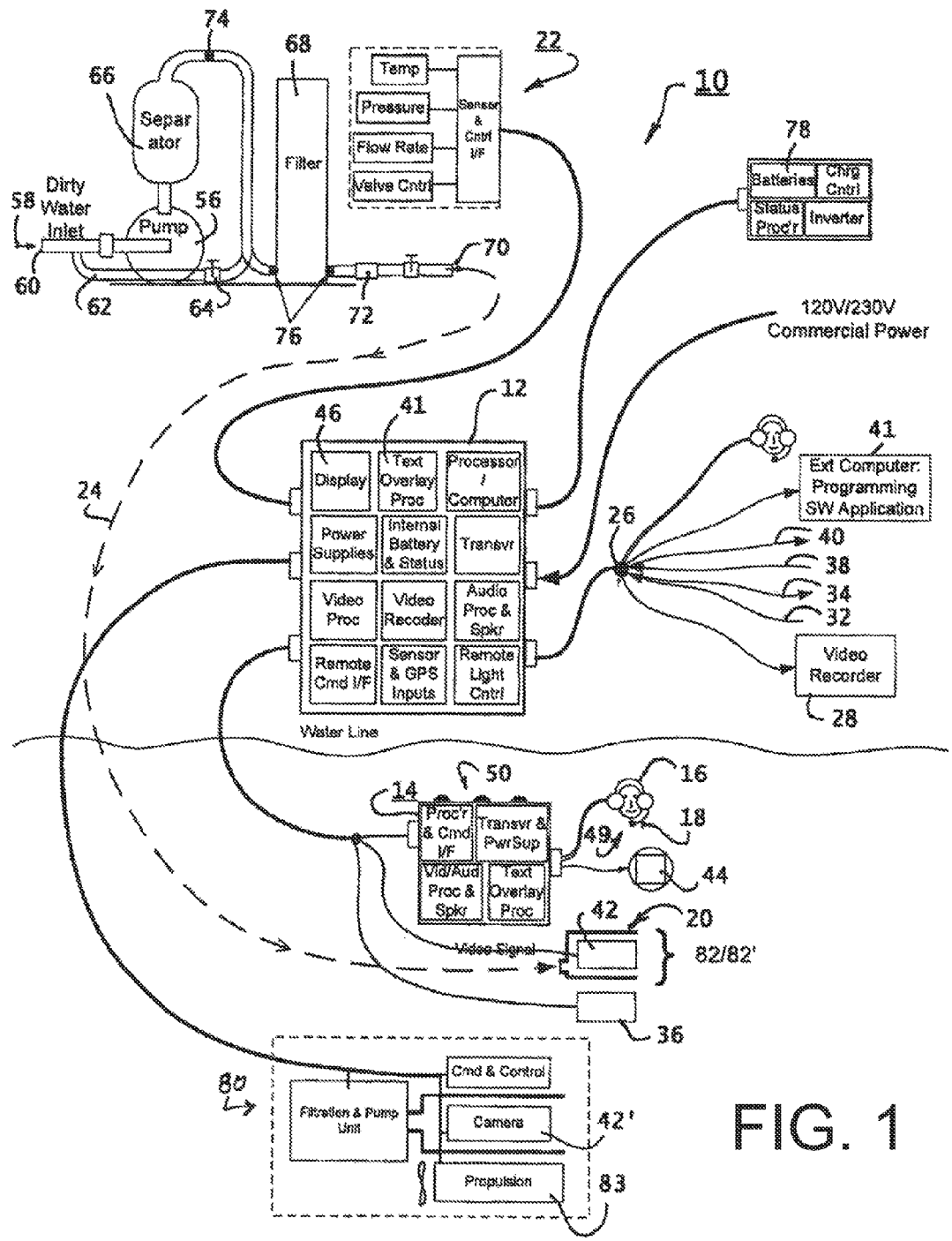
FIG. 1 is a detailed schematic of the entire integrated system for diving operations in turbid water showing all of the system components.
Figure 2:
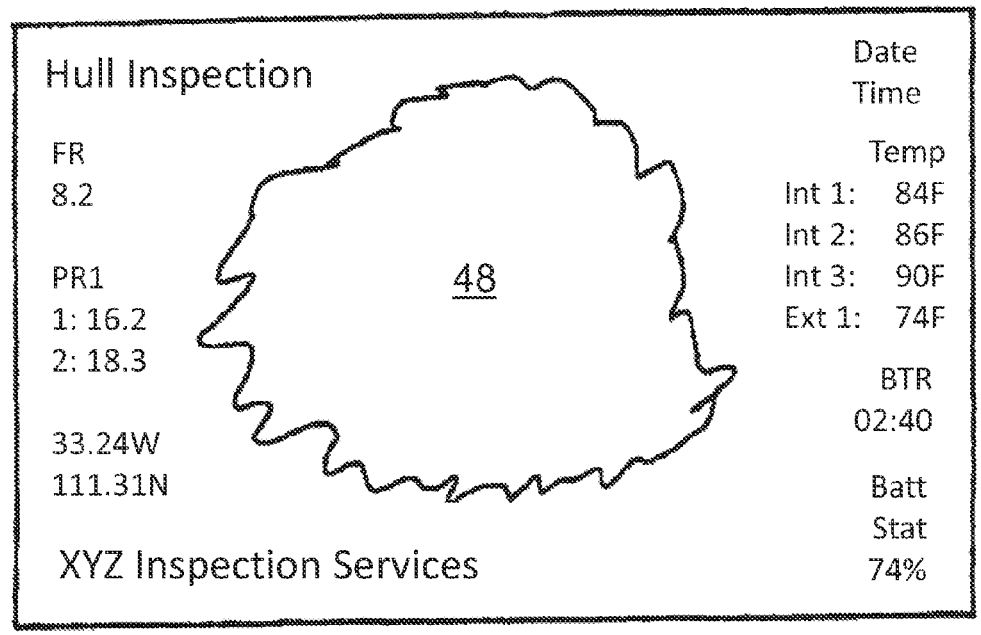
FIG. 2 is a schematic drawing of an exemplary SCS video display in accordance with the present invention. The information is formatted and presented on the display as determined by the software user application.

Referring to FIG. 1, an integrated system of systems 10 for underwater viewing and communications in turbid water includes: a) a surface console station (SCS) 12; an external power battery supply; a remote information and video processing unit (RIPU) 14, preferably including headphones 16 and microphone 18; a remote mask or helmet-mounted display for diver viewing; and a visibility impaired viewing device (VD) 20. VD 20 is supplied with clear fluid either by surface pump/filtration system 22 with temperature/pressure/flow sensors and valve control 64 connected to VD 20 via hose 24 or by a self-contained clear-fluid supply apparatus (later shown in detail in FIG. 8) coupled to a VD.

SCS 12 is a complete, self-contained system that allows for a SCS operator to communicate with the RIPU operator, comprising standard or typical commercial interface connections, such as those used for audio 32 and 34, video 38 and 40, and computer interfaces 28 and 41 for programming and external digital recording all bundled together into cable 26 that allows for real-time video processing and capture by either an internal or external video recorder 28; optional lighting apparatus 36 (mounted on the VD) control-selectable video format input 38 (e.g., NTSC, PAL, or video/voice-over-IP) and output 40 and on-screen text and/or graphics overlay 41/46 for event narration and information capture, and digital command and control of the surface system and/or the ROV from the RIPU 14 over a digital communications channel. SCS 12 includes a software application running on a computer, to allow user-defined data and information and to allow and provide for data formatting and text overlay onto or merging with a video image and the creation of user-defined information files.

SCS 12 receives and accepts commercial AC power, DC power (internal DC power (batteries) or external DC power sources 78, allows for the selection of input power, and converts this power into the necessary system operational power for use by the SCS 12, the RIPU 14, optional remote lighting apparatus 36, image capture device (camera) 42, and ROV 80.

SCS 12 further comprises an integrated keypad or keyboard device, operating system, and display that allow the recall of pre-defined information files, and the creation, modification and saving of information files. An integrated processor receives and manipulates formatting application and system data and information and other internal or external sensory performance data and displays this data as independent or overlaid text and graphical imagery onto and over a received video image. SCS 12 allows merging and integration of decoded video-over-IP, text and graphical information that allows for a consistent what-you-see-is-what-you-record (real-time) system in multiple analog and/or digital video streaming format outputs.

SCS 12 includes one end of a digital packetized communications scheme, such as standard Internet Protocol (IP) that: 1) initiates bi-directional digital voice communications, 2) allows for and receives command and control of the system from the remote location, 3) receives remote health status of the remote operator (diver) operating the VD, and 4) allows exchange of other information provided over a digital communication channel, while operating in semi-turbid, hazardous and/or black water conditions.

SCS 12 may include an integrated GPS, night light capability, selectable video format, and the means to communicate to a plurality of divers simultaneously.

Figure 3:
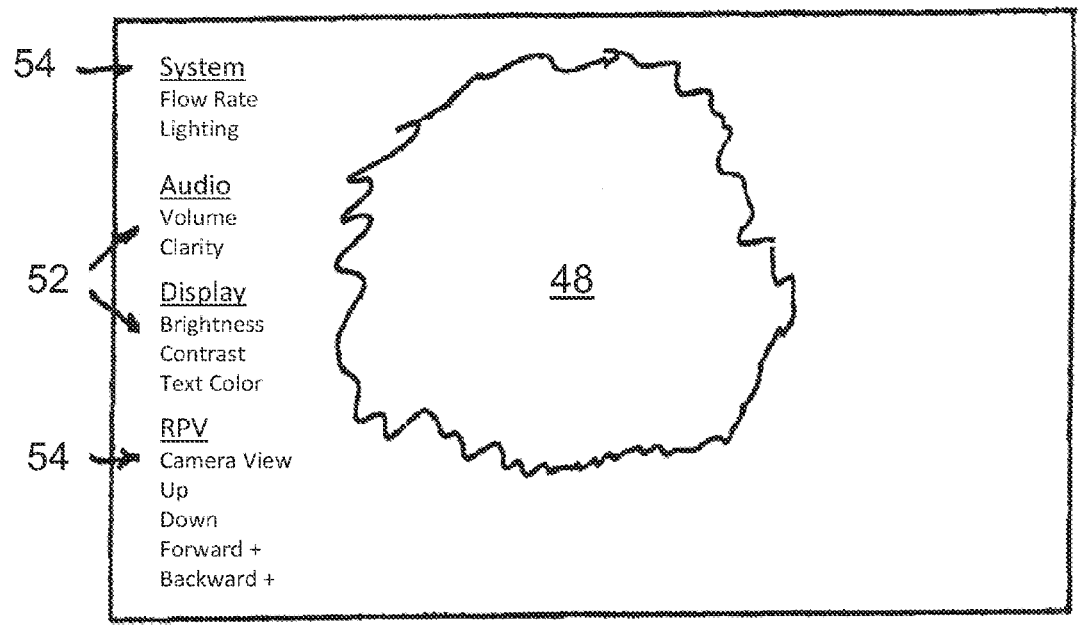
FIG. 3 is a schematic drawing of an exemplary remote video display such as a diver's mask-mount display. The information is formatted and presented on the display as determined by the software user application.

The video image transmitted by camera 42 associated with VD 20 is received by the RIPU video display 44 in view of the diver, which may be mounted on a diver's helmet or mask, and the display of the SCS. In each location, unique information text or graphical data is overlaid and displayed onto the real-time, processed video image 48 (FIGS. 3 and 4) appropriate to that user. The information is selected, formatted, and presented on the screen as determined by the software user application specifically written for this application.

The information displayed allows for display of both static and dynamic data on the either the SCS or remote video displays. Textual information generated and merged with the live video stream information could include the static information such as the event, the client, or a comment/notes, and dynamic data, time/date/location, GPS, operational info, and RIPU diver-specific info such as depth, compass headings, dive time, time, available air, water temperature and other operational information relative to his environment or in support of the dive.

RIPU 14 is a component of system 10 which may be worn by a remote operator 49, such as a diver, comprising of a computer, and real-time operating system, display capabilities, and integrated human operated controls or voice-operated controls for the manipulation of information for audio, video, and information exchange purposes. RIPU 14 allows the operator to adjust audio parameters, such as volume and music selection, and video parameters, such as brightness and contrast, all of which is to support the dive mission. RIPU 14 comprises a digital packetized communications scheme that allows for voice and/or video-over-IP, the control and exchange of information, such as, but not limited to: 1) bi-directional voice communications, 2) command and control of the surface systems, 3) providing of remote health status from the remote IPU to SCS 12, 4) providing and receiving of the exchange of information over the digital communication channel, and 5) the control of system functions, such as the illumination of the underwater lamps and water flow rate. RIPU 14 receives information or messages from SCS 12 and local sensory inputs, processes the information and overlays or merges this information with the RIPU video image for display, such as 48 (FIG. 3), to be seen by the remote operator/diver. Camera 42 outputs one or more video signals to be transmitted to SCS 12, RIPU 14, and/or other devices or receivers for further processing prior to transmission.

Unique to a remote operator 49 is the ability to see the video image 48, converted or encoded as necessary, with overlaid or merged textual and/or graphical information and data to support the remote operator in performing his duties and control system functions from his remote location. The information as seen by the remote operator is formatted and presented on remote video display 44 as determined by the software user application. With RIPU 14 and integrated control mechanism, for example, tactile buttons 50 or voice command control, the remote operator can visibly see a displayed menu structure by which he may select, change or control either local functions 52 (FIG. 3), such as audio volume or display brightness/contrast, or system functions 54 (FIG. 3), such as water flow rate and lighting intensity. Display of other RIPU diver-specific information may include but not limited to depth, compass headings, dive time, time, available air, water temperature and other operational information relative to his environment or in support of the dive. An optional ROV 80 may also be maneuvered via the integrated control mechanism and the displayed menu selection or by voice commands transmitted to the ROV.

The remote video display 44 may be, for example, a modified military helmet-mounted display such as those available from Liteye Systems, Inc., Centennial, Colo., USA or a display uniquely developed for underwater operations. The remote audio system comprises microphone 18 and headphone(s) 16, such as those provided by Ocean Technology Systems of Santa Anna, Calif., to allow the remote operator 49 to communicate with the SCS Operator. The system comprises an integrated video display of the merged video image and information transmitted to it from RIPU 14 to the remote video display 44.

Pump/filtration system 22 draws in ambient fluid by a pump, wherein the fluid is filtered and refiltered in a continuous feedback loop through a particle remover/separator or filter, and deliver a portion through one or more additional filters 68 to clarify and/or purify the fluid delivered to VD 20.

Pump/filtration system 22 comprises a pump 56 for receiving both turbid water 58 through inlet 60 and feedback recirculated water 62 via recirculation control valve 64. Pump 56 drives water through a separator 66, such as that provided by WaterCo of Atlanta, Ga., USA, that removes large particulates and thence through filter 68 to clarify the water to outlet 70. System 22 controls the discharge output rate and pressure with control valve 64 in the feedback loop. One or more inline sensors 72,74,76 monitor flow rate 72, temperature 74, and pressure points 76 and send sensor data to SCS 12 for interpretation and display of the information. Flow rate, lighting, and other system functions may be controlled by the remote operator 49 over the communications line by commanding the position of valve 64, the lighting control, and other system functions, respectively.

System 22 may also be powered selectively from an external battery power source 78 or internal batteries, either of which may be automatically recharged when attached to commercial AC power.

System 10 may also control the propulsion means 83 of optional ROV 80 by remote operator 49 wherein VD 20, including camera 42' and optionally a lighting apparatus may be mounted on ROV 80.

Referring now to FIGS. 1 and 4 through 7, in one aspect of the invention, a hand-held VD 82, comprises a cylindrical body 84, including camera 42, terminating in a forward microfiber housing retainer 86 at a distal end thereof and a flange 87 at a proximal end thereof and having a central water supply inlet port 88. Flange 87 is provided with a plurality of longitudinal bores 90. A rotatable gate valve 92 having a plurality of ports 94 is transversely disposed against flange 87 (see FIG. 5). A handle 91 is attached to body 84. All water flow rate controls for VD 20 are commanded from the RIPU 14.

Clear water 25 received through hose 24 from, for example, pump/filtration system 22 is admitted through inlet port 88 to a de-pressurization and distribution chamber 96 within body 84. A first portion of clear water 25 is directed forwardly in VD 20 through a perforated backpressure control gate 98 (see FIG. 6) into an inner flow chamber 100 surrounding axially-mounted camera 42, thence through a forward camera retainer 102 (see FIG. 7), a turbulence equalizing screen 104, and microfiber flow-shaping screen 106, resulting in a laminar flow clear stream 108 bounded by a turbidity boundary layer 110. A clear viewing port 112, aligned with a proximal end of flow-shaping screen 106, allows camera 42 a view along the axis of clear-water stream 108. Camera 42 is connected to RIPU 14 via cable connector 114 and cable 116.

The improved arrangement of embodiment 82 overcomes a problem inherent in a prior art helmet-mounted VD. Laminar stream 108 exerts a rearward reaction force on the VD which may act to displace a diver from a desired position. Accordingly, a portion of the pressurized water in chamber 96 may be directed rearward through bores 90 by controlling the rotary position of rotatable gate valve 92 to vary the occlusion of bores 90, thereby offsetting to a controllable degree the thrust of laminar stream 108. In a presently preferred embodiment, body 84 is formed in three sections (rear section 84a, center section 84b, and forward section 84c) along first and second joints 85a, 85b to facilitate separation and access to components there within.

Figure 8:
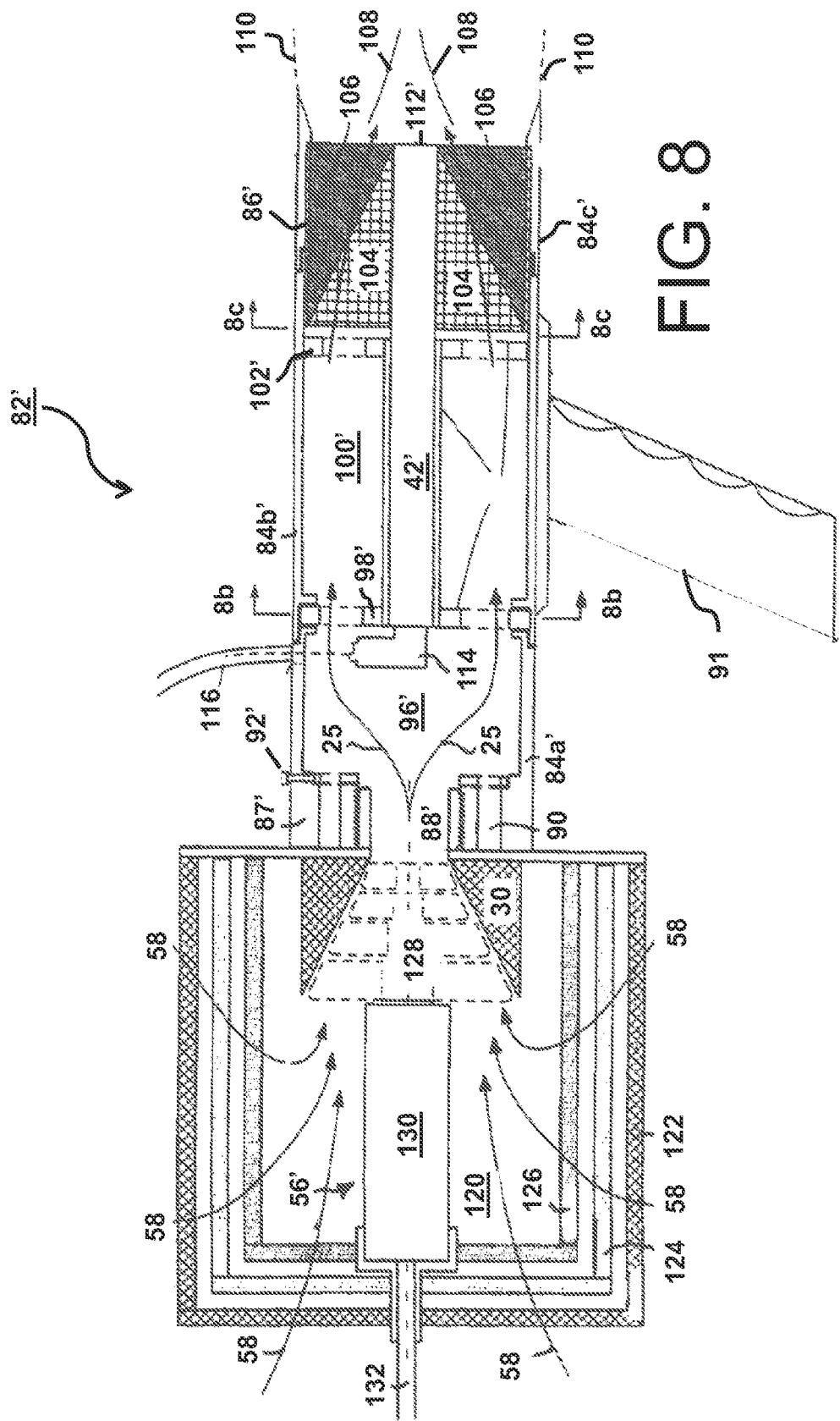
FIG. 8 is an elevational cross-sectional view of a VD having an integrated clear-water supply apparatus and an inverted velocity-shaping profile micro-screen, in accordance with the present invention.

Referring to FIG. 8, in another aspect of the invention, embodiment 82' of a hand-held VD 20 is shown. The mechanics and forwardly flow paths of clear water through embodiment 82' are substantially identical with those of embodiment 82 and need not be described further here. Reference numerals indicated with a prime (') are modifications specific to embodiment 82', with all other reference numerals as described in reference to first embodiment 82 in FIG. 4.

One difference between embodiments 82 and 82' is that rear section 84a is replaced by a modified rear section 84a' that accommodates mating with integrated pump/filtration system 22' in lieu of a separate system that pipes in the clear water via a hose. Pump/filtration system 22' comprises a central chamber 120 surrounded and defined by staged filters, e.g., coarse filter 122, medium filter 124, and fine filter 126. A pump 56' comprising pump elements 128, a powered electric motor 130, and connection 132 to a power source (battery pack, power lines, etc. not shown) is centrally mounted within chamber 120. Pump 56' draws turbid water 58 from a surrounding supply, filters the water to form clear water 25, and propels clear water 25 forward into VD 20 as in embodiment 82. Thus, embodiment 82' is freed of any water hose connection and dependence of the surface-based pump/filtration system 22.

Referring once again to FIG. 8, another difference between embodiments 82 and 82' is the presence of conical turbulence equalizing screen 104 that is nested in water velocity, flow-shaping screen 106 that is shown as an inverted cone. As can be seen, the distal end of camera 42' aligns with the distal end surface of flow-shaping screen 106 making for a more longitudinally compact VD.

Figure 4:
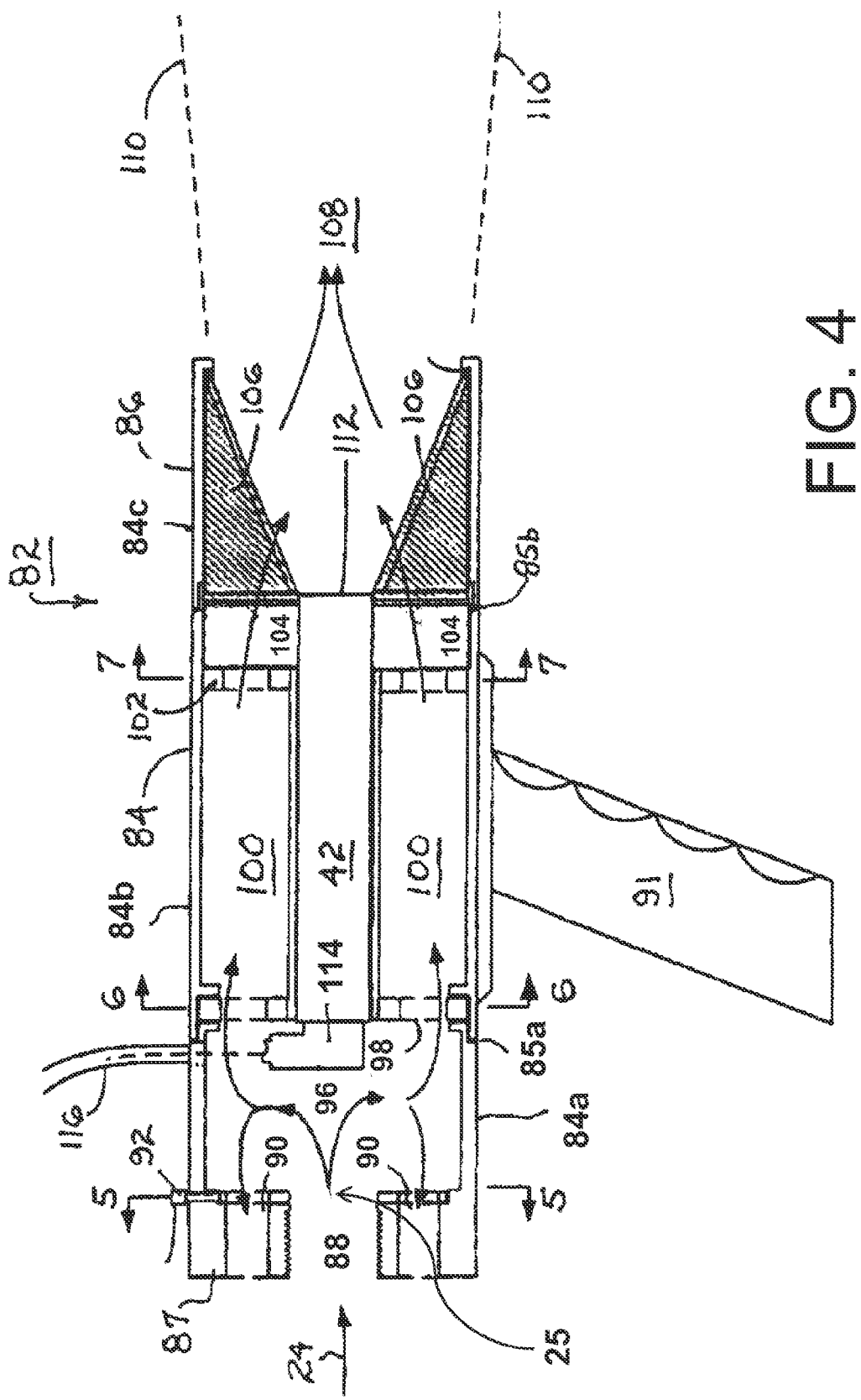
FIG. 4 is an elevational cross-sectional view of a VD utilizing an external or surface-supplied clean water, in accordance with the present invention.
Figure 5:
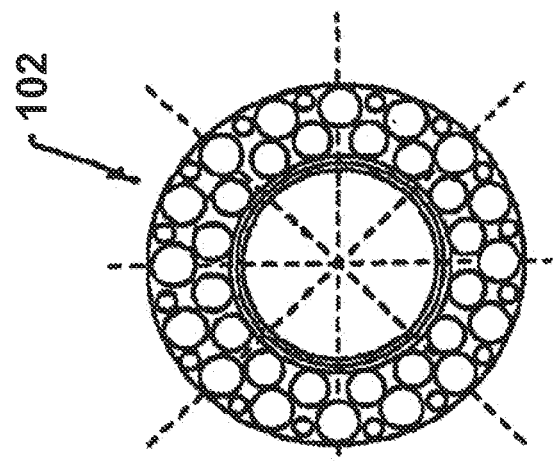
FIG. 5 is a cross-sectional view taken along line 5-5 in FIG. 4.
Figure 6:
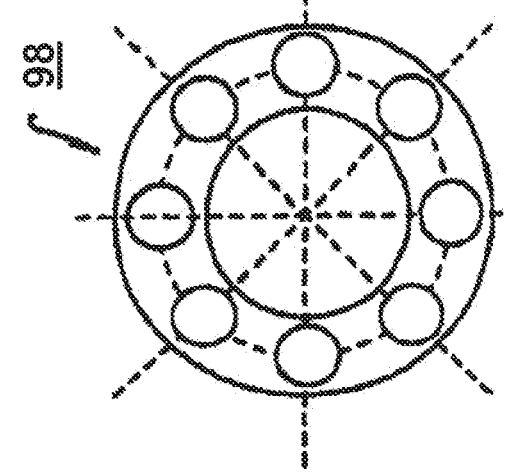
FIG. 6 is a cross-sectional view taken along line 6-6 in FIG. 4.
Figure 7:
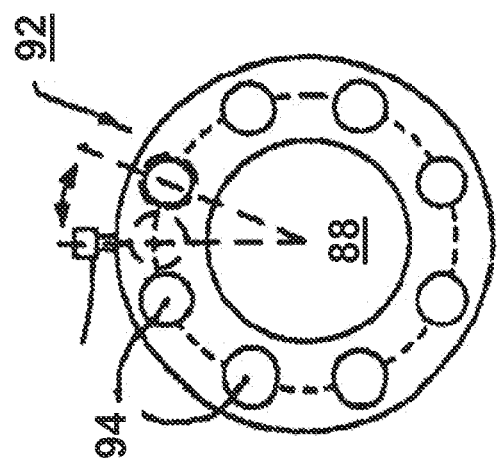
FIG. 7 is a cross-sectional view taken along line 7-7 in FIG. 4.
Figure 9:
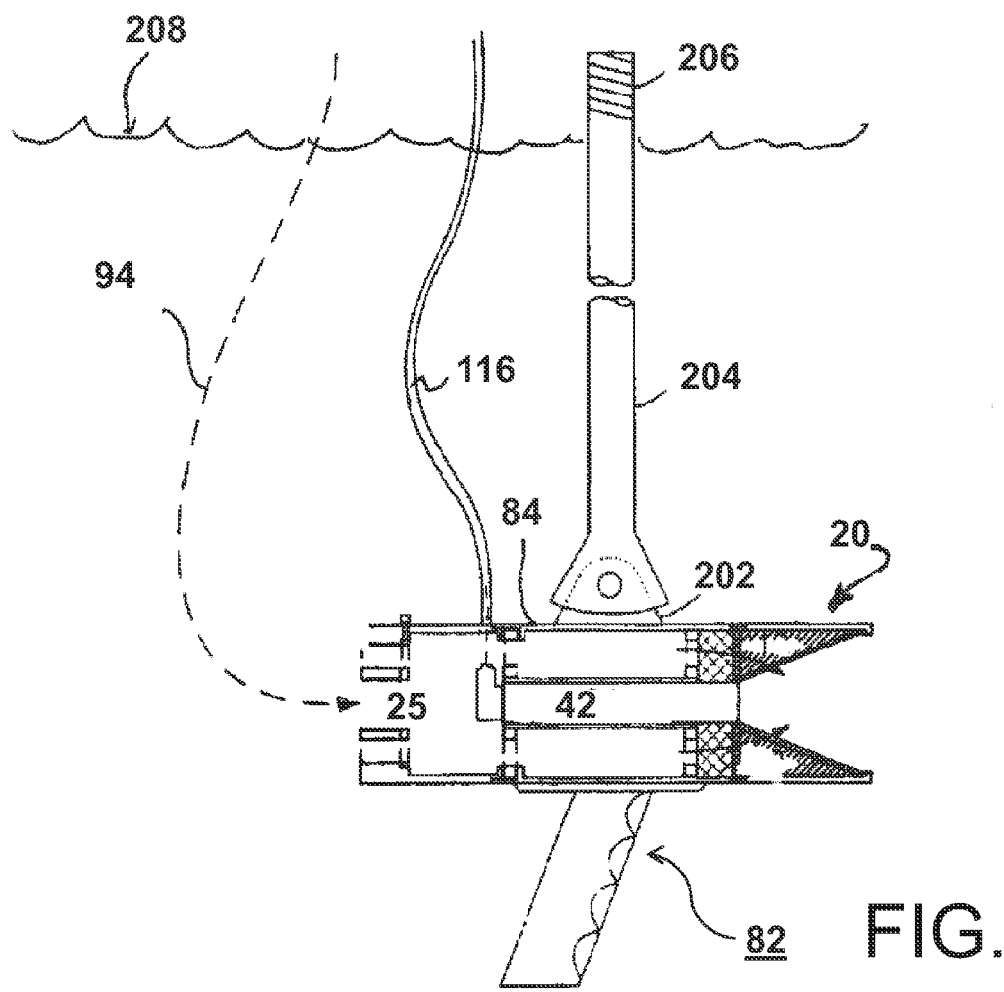
FIG. 9 is an elevational view of a VD mounted on a pole for operation by a remote operator, in accordance with the invention.

Referring now to FIG. 9, VD 20 of embodiment 82 (shown) or of embodiment 82' (not shown) may be mounted on a pole for remote operation of the VD 20 by an operator on shore, off a dock, or from a boat. Auxiliary bracket 202 may be attached to body 84 for receiving distal end 204 of pole handle 206. In situations such as in shallow water, to examine, for example, a bridge pier or boat hull, VD 20 may be manipulated by a remote operator positioned above the water surface 208 via pole handle 206. Water supply 24 may provide clear water 25 to VD 20 from a clear water supply source such as pump/filtration system 22 as shown in FIGS. 1 and 4. Alternatively, clear water 25 may be supplied via a self-contained filtration system 22' as shown in FIG. 8. Video imaging from camera 42 may be displayed to the remote or SCS operator, via cable 116, as a real-time video image on the SCS, thereby providing video imaging to the user, as previously described.

FIG. 10 shows a further embodiment of a VD mounted to an ROV 80, wherein the ROV is controlled or manipulated by the remote diver via the RIPU and display. In this embodiment, ROV 80 includes an integrated pump/filtration system 22'. As shown, the remote diver and RIPU 14 communicate with and control ROV 80 via command and control SCS 12 to direct the commands to the ROV, including its movement via propulsion means 83. The SCS video display and the remote video display receive real time images captured by camera 42' and recorded on either an internal or external video recorder 28. Power to drive the pump motor 130 in system 22' may be supplied by an onboard battery 93. In an alternative embodiment, power may be supplied to pump motor 130 by a cable running from a power source located on the surface (such as power source 78 as shown in FIG. 1). As above, SCS 12 is coupled with user interface cable 26 as described above in reference to FIGS. 1 and 10.

In the embodiments described in FIGS. 1 and 10-13 and as disclosed above and below, the computer-based user software application performs several functions including: (1) allowing for the selection and formatting of textual and/or graphical information or data to be shown on the SCS display in a manner preferable to the user; (2) allowing for the selection and formatting of textual and/or graphical information or data to be displayed on the remote display in a manner most suitable to the diver; (3) providing the means to retrieve and re-program the SCS or the RIPU operational firmware over the communication channel; (4) providing the means to retrieve revised versions of the user application, for use on the SCS; and (5) provide for instant commands, communications, text messaging or chatting between the SCS operator and remote diver or user or plurality of divers.

Textual or graphical information displayed on the SCS display is created using a software application specifically written to work with this system. It has the advantage of being tailored to this system, its sensors and functions, and to the specific application and use. This software user application allows for the formatting of information on both the SCS video display and diver-specific information on the remote video display. This software also has additional utility of allowing textual and/or graphical information to be passed to the diver without the need for verbal instructions. Another capability of this software also allows for the SCS and remote IPU to be reprogrammed with either operational firmware or screen data presentation formatting options.

Figure 11A:
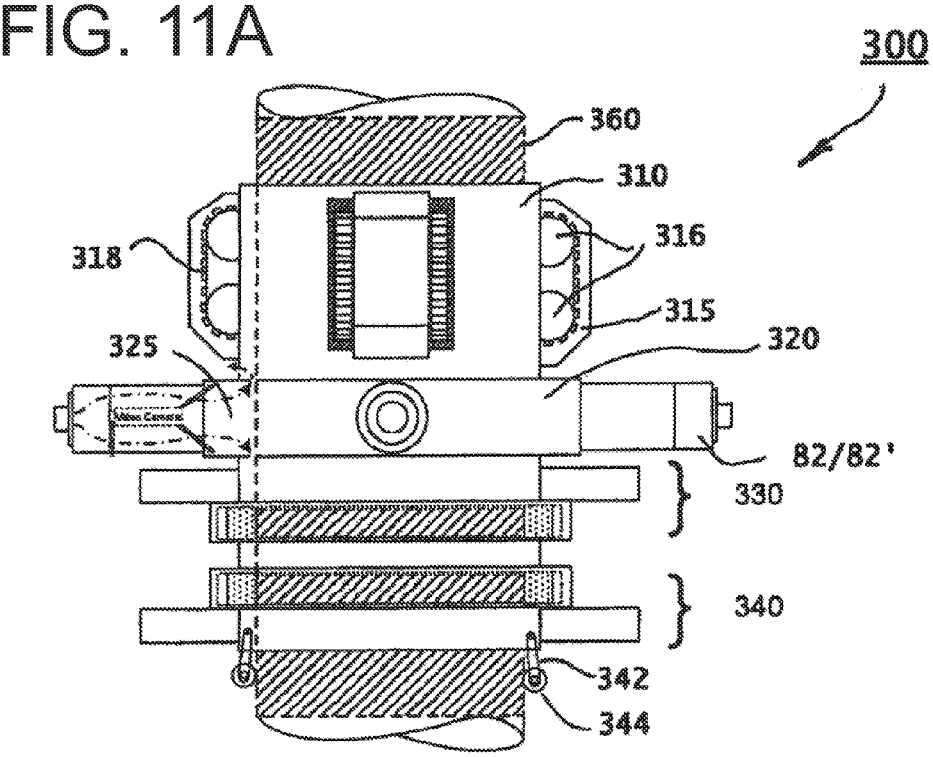
FIG. 11A is an elevational cross-sectional view of an array of VDs that can be used to inspect a wharf or bridge piling structure, in accordance with the present invention.
Figure 11B:
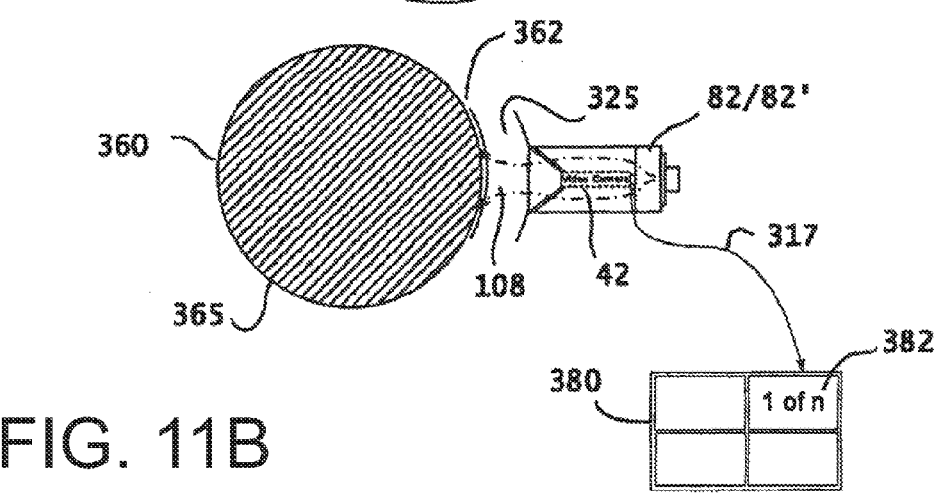
FIG. 11B is an overhead view of a camera and shroud of a portion of the apparatus shown in FIG. 11A.

Referring now to FIGS. 11A and 11B, an array of VDs is indicated generally by reference numeral 300. The array of VDs 300 is designed to encircle an elongate object and travel axially along the surface of the elongate object while cleaning and inspecting its surface. An example of such an activity is the inspection of cylindrical pillars and posts used in bridge or pier construction. VD array 300 generally comprises a crawler base and support housing 310 which supports a plurality of track drive housings 315. Within track drive housing 315 is a track drive mechanism composed of wheels 316 around which is mounted a track 318. During operation, VD array 300 is moved axially along a pillar or post 360 by operation of track 318. Power is supplied to wheels 316 to turn the wheels and advance track 318. VD array 300 is mounted snuggly against surface 365 of pillar or post 360 such that VD array 300 will not fall or slide along the surface. All movement of VD array 300 along the surface is a function of the track drive mechanism and guide mechanism 342/344.

Coupled to crawler base and support housing 310 is shroud housing 320. Shroud housing 320 is adapted to support a plurality of individual VDs 82/82' (as described above with reference to FIG. 4 and FIG. 8, respectively) to create the array of VDs 300. Shroud housing 320 is proportioned so as to create clearing chamber 325 between shroud housing 320 and the pillar being inspected. Clearing chamber 325 allows clear water stream 108 to flow from each VD 82/82' through the chamber and to impact pillar or post surface 365 and out gap 362. Crawler base and support housing 310 provides gap 362 between support housing 310 and surface 365. The gap prevents turbulent backflow of the clear water (and any dirt or debris in the black water) to flow into clearing chamber 325. As a result, camera 42 captures clear images of surface 365. Shroud housing 320 also holds camera 42 at a distance from surface 365 thereby generating a larger field of view. Video feed from each camera 42 is directed to a corresponding video monitor (as described above) on the surface by cable 317. Each camera within the array corresponds to a particular video feed to a particular monitor in the monitor array (e.g. monitor 382 in monitor array 380). Thus, with the use of VD array 300, the entire surface of a pillar or post can be cleaned, scanned, viewed and recorded in a single pass.

Referring again to FIG. 11A, mounted below shroud housing 320 are surface cleaners 330 and 340. In one aspect of this embodiment, VD array 300 is placed above cleaners 330 and 340, around the pillar or post that is to be inspected. VD array 300 is then controllably direct down the axis of the pillar or post by the track drive mechanism. Surface cleaners 330 and 340 advance ahead of shroud 320 and crawler base and support housing 310. The surface cleaners are equipped with scrubbers, such as brushes or high pressure water jets, to remove surface dirt and debris which has collected on surface 365. Thus, camera 42 is able to take images of the actual surface of the pillar or post after the surface has been cleaned. The cleaned surface also aids track 318 in holding snuggly onto the pillar or post surface while minimizing the possibility of jamming the treads of the track which might render the track immobile. Stabilizing wheels 344 are mounted to the end surface cleaner 340 by way of struts 342. Stabilizing wheels 344 assist maintaining VDs 82/82' of VD array 300 in a generally perpendicular orientation to surface 365.

Referring now to FIGS. 12A and 12B, an application of a VD array is indicated generally by reference numeral 400. VD 400 is a handheld (or ROV-based) array of VDs 82/82' mounted onto a handle and support structure 491. Ideally, cameras 42 of each VD 82/82' are aligned such that, at proper focal length, the field of view of each camera intersects, and slightly overlaps, the field of view of adjacent cameras. Thus, the array of cameras is able to generate a much larger effective field of view with minimal overlapping images to ensure areas of coverage.

VD 82/82' further includes clearing shroud 420. Clearing shroud 420 allows clear water stream 108 to flow from VDs 82/82' to impinge on the surface 465 while preventing much, if not all, of the resultant debris and/or black water to impede the camera's view. As described above, the video feed is directed to a diver and/or to the surface by cables 416. Each camera 42 has a dedicated cable 416 which feeds to a dedicated, corresponding monitor 482 in a monitor array 480, wherein the multiple images are re-assembled as a single image made-up of a composite of individual images. To aid in video capture, a plurality of lights 470 for surface illumination may be mounted onto clearing shroud 420.

Figure 13A:
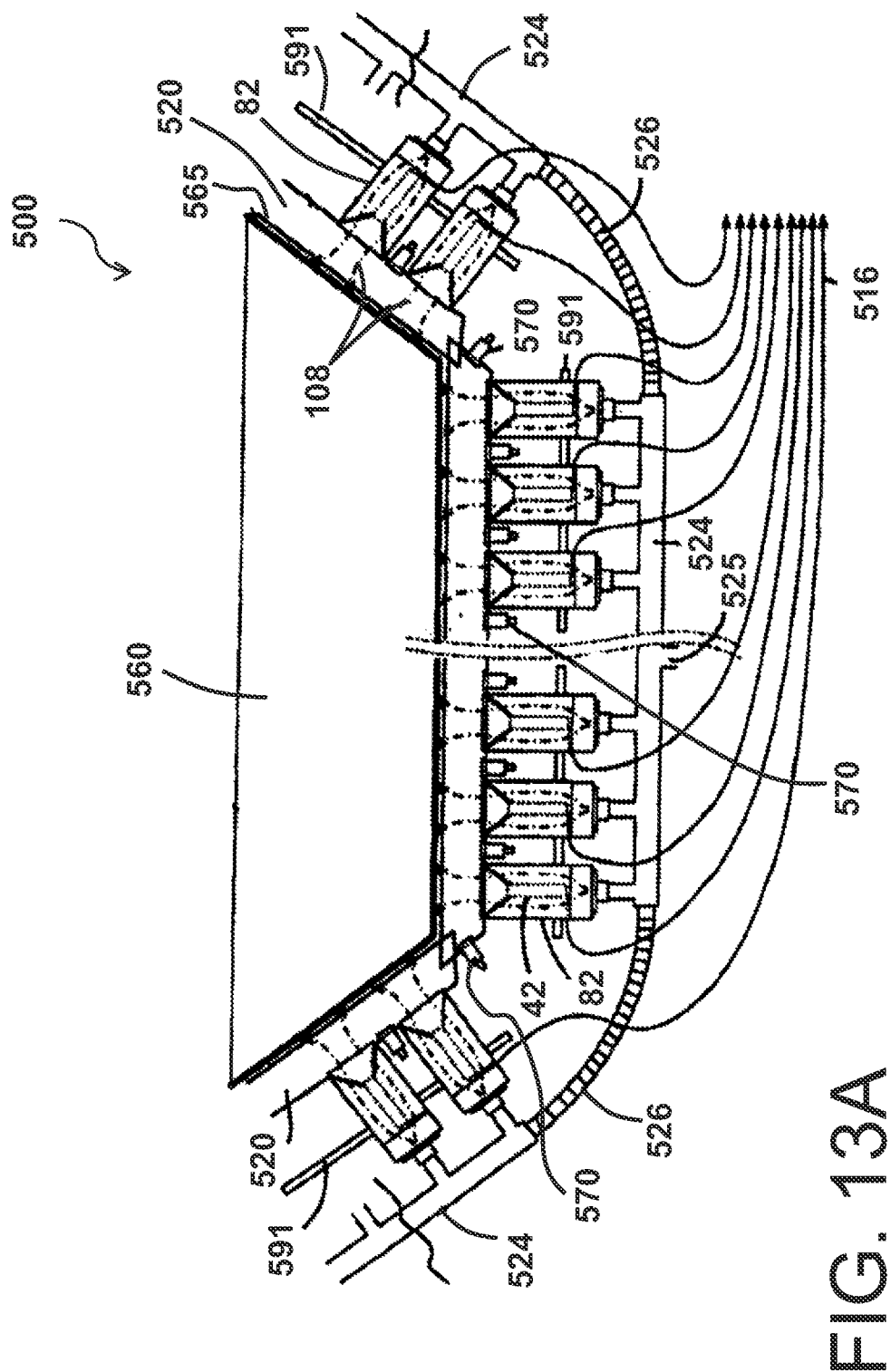
FIG. 13A is an elevational cross-sectional view of another application of an array of VDs utilized for inspecting a boat hull, in accordance with the present invention.

Referring now to FIG. 13A, an array of VDs of yet another application of an array of VDs, is indicated generally by reference numeral 500. VD array 500 is comprised of a multiplicity of VDs 82 mounted onto a series of support structures 591 to form a length of complimentary camera views along a generally straight line. Although shown as only a single row of VDs, VD array 500 can be a constructed as a duplex, triplex or other desired multiplex of rows of VDs. Ideally, cameras 42 of each VD 82 are aligned such that, at proper focal length, the field of view of each camera slightly overlaps the field of view of adjacent cameras to ensure view coverage. Thus, the array of cameras is able to generate a much larger effective field of view with minimal overlapping areas of coverage.

VDs 82 further include clearing shroud 520. Clearing shroud 520 allows clear water stream 108 to flow from VD 82 to impinge on the surface 565 while preventing much, if not all, of the resultant debris and/or black water to impede the camera's view. Clear water 108 may be supplied to VDs 82 from the surface by pumping clear water into inlet 525 where it passes through tubing distribution manifold 524 to the individual VDs. In one aspect of the invention, two or more supply tubes 524 are connect via flexible tubing 526. In this embodiment, the flexible tubing allows the support structure holding one or more VDs to be bent at an angle relative to a second support structure. Thus, for inspecting the hull of a ship for example, one length of support structure (with accompanying VDs) inspects the starboard side of the ship while a second length of support structure (with accompanying VDs) inspects the hull, and a third length of support structure (with accompanying VDs) inspects the portside. The flexible tubing allows divers, or electromechanical adjusters, to manipulate the cameras to continuously capture images of the bottom of a ship as it passes above the apparatus. As described above, the video feed is directed to a diver and/or to the surface video recording system by cables 516. Each camera 42 has a dedicated video cable feed 516 which feeds to a dedicated monitor in a monitor array, wherein the multiple images are re-assembled as a single image made-up of a composite of individual images. To aid in video capture, a plurality of lights 570 are mounted onto clearing shroud 520.

Figure 13B:
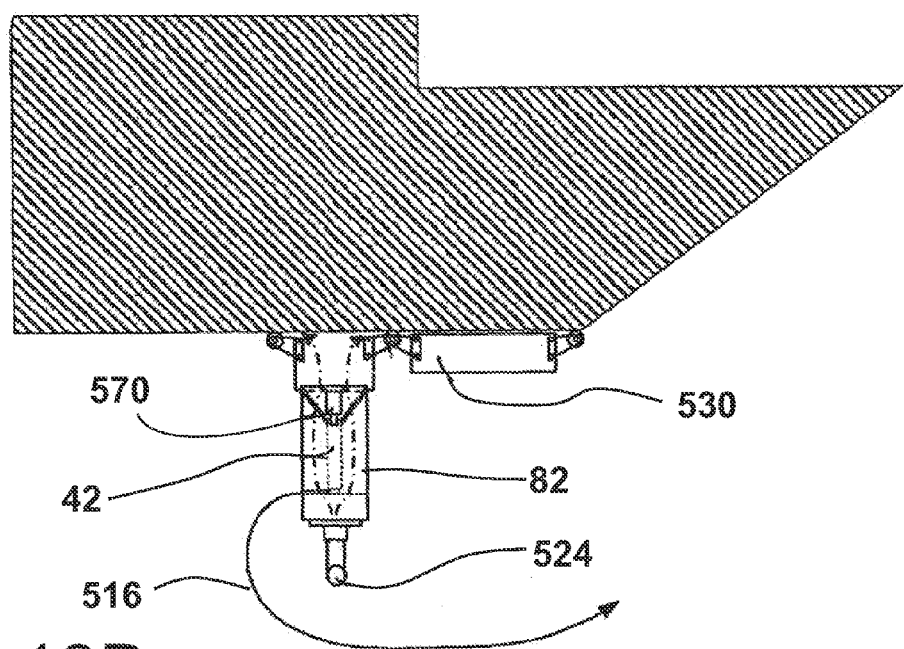
FIG. 13B is a view of the device shown in 13A including the associated surface cleaning mechanism, in accordance with the invention.

FIG. 13B shows one of the multiple VDs shown in FIG. 13B. Adjacent VD 82 is surface scrubber or cleaning mechanism 530 having abrasive high pressure spray jets for cleaning the surface of the hull before the hull passes over VD 82.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A unified digital communications-based system for viewing in turbid water, comprising
   a) a surface console station having a first information processor and first actionable controls;
   b) a first video display coupled to the surface console station;
   c) an information processing unit remote from said surface console station and having a second information processor;
   d) a viewing device operatively coupled to said surface console station;
   e) a second video display operatively coupled to said information processing unit;
   f) a liquid filtration and delivery system in fluid communication with said viewing device, wherein the liquid filtration and delivery system directs a first portion of water filtered by the liquid filtration and delivery system in a forward direction of said viewing device to provide an approximately clear view in front area of said viewing device and a second portion of water filtered by the liquid filtration and delivery system in a rearward direction of said viewing device to offset a thrust of the first portion of approximately transparent water; and
   an image capturing device coupled to said viewing device and information processing unit remote from said surface console station, wherein said image capturing device transmits video images viewable on said first video display and said second video display.

2. A unified digital communications-based system in accordance with claim 1 further including a two-way digital communication link between said surface console station and said information processing unit, wherein said two-way digital communication link provides bi-directional voice and data communication between said surface console station and said information processing unit, transmission of health monitoring data, system status, and operational data from said information processing unit to said surface console station, and transmission of command/control signals to said information processing unit from said surface console station.

3. A unified digital communications-based system in accordance with claim 2, further comprising a second actionable control coupled to said information processing unit, wherein at least one of said first or second actionable controls control said two-way digital communication link.

4. A unified digital communications-based system in accordance with claim 1, comprising second actionable controls coupled to said information processing unit to control said first portion of water directed in said forward direction, said second portion of water directed in said rearward direction, and a brightness level of said second video display.

5. A unified digital communications-based system in accordance with claim 1 further comprising a software user application configured for transmission of data and text between said surface console station and said information procession unit and to provide at least one of text and graphic overlays over said video image presented on said first video display and said second video display.

6. A unified digital communications-based system in accordance with claim 5 wherein said software user application is accessible from either said surface console station or said information processing unit for system configuration function selection.

7. A unified digital communications-based system in accordance with claim 1 further comprising a software user application configured for performing one or more of: selecting and formatting of textual and/or graphical information or data to be shown on said first video display; selecting and formatting of textual and/or graphical information or data to be displayed on said second video display; retrieving and reprogramming surface console station firmware and information processing unit firmware over said communication link; retrieving revised versions of said software user application for use on the surface console station; and enabling instant commands, communications, text messaging or chatting between a surface console station operator and at least one remote information processing unit operator.

8. A unified digital communications-based system in accordance with claim 1 wherein said viewing device is mounted on a remotely operated vehicle.

9. A unified digital communications-based system in accordance with claim 8 wherein said information processing unit further includes second actionable controls and said remotely operated vehicle is controlled by either of said first or second actionable controls.

10. A unified digital communications-based system in accordance with claim 1 wherein said liquid filtration and delivery system comprises at least one sensor and a feedback control loop to control flow of liquid to said viewing device.

11. A unified digital communications-based system in accordance with claim 1 wherein said liquid filtration and delivery system is integrated within a rear section of said viewing device as a single unit.

12. A unified digital communications-based system in accordance with claim 1 comprising a plurality of viewing devices each producing individual video images wherein said individual video images are displayed in composite form on said first video display.

13. A unified digital communications-based system in accordance with claim 12 wherein said plurality of viewing devices is disposed in an array to inspect ship hulls.

14. A unified digital communications-based system in accordance with claim 13 further comprising at least one scrubber configured to clean said ship hulls prior to said viewing.

15. A unified digital communications-based system in accordance with claim 1 wherein said viewing device is mounted onto a crawler device and wherein said crawler device is configured to move along a structure in view of said viewing device.

16. A unified digital communications-based system in accordance with claim 15 wherein said crawler device is mounted with a plurality of viewing devices.

17. A unified digital communications-based system in accordance with claim 15 further comprising at least one scrubber configured to clean said structure prior to said viewing to permit single pass inspections of said structure.

18. A unified digital communications-based system in accordance with claim 1 wherein said viewing device is mounted on a pole.

19. A unified digital communications-based system in accordance with claim 1 further comprising an adjustable valve coupled to said viewing device to adjust a flow rate of the second portion of water.

20. A unified digital communications-based system in accordance with claim 1 further comprising a device for identifying structural anomalies found in the viewed structure and wherein said surface console station further includes a software application able to identify and tag said anomalies.

21. A unified digital communications-based system in accordance with claim 1 wherein said viewing device includes a flow shaping screen wherein a distal end of said flow shaping screen is flush with a distal end of said image capturing device.

22. A unified digital communications-based system for viewing in turbid water, comprising
 a) a surface console station having a first information processor and first actionable controls;
 b) an information processing unit remote from said surface console station and having a second information processor;
 c) a first video display operatively coupled to said surface console station;
 d) a viewing device operatively coupled to said information processing unit;
 d) a liquid filtration and delivery system in fluid communication with said viewing device, wherein the liquid filtration and delivery system directs a first portion of water filtered by the liquid filtration and delivery system in a forward direction of the viewing device to provide an approximately clear view in front area of the viewing device and a second portion of water filtered by the liquid filtration and delivery system in a rearward direction of the viewing device to offset a thrust of the first portion of approximately transparent water, wherein said liquid filtration and delivery system is integrated within a rear section of said viewing device as a single unit;
 e) an image capturing device coupled to said information processing unit remote from said surface console station, wherein said image capturing device transmits video data viewable on said first video display and a second video display coupled to the viewing device; and
 f) a two-way digital communication link between said surface console station and said information processing unit, wherein said two-way digital communication link provides bi-directional voice & data communication between said surface console station and said information processing unit, transmission of health monitoring data from said information processing unit to said surface console station, and transmission of command/control and information data to said information processing unit from said surface console station.

* * * * *